June 9, 1925.
E. BUCKINGHAM.
METHOD OF FORMING HELICOIDAL SURFACES
Filed March 13, 1922
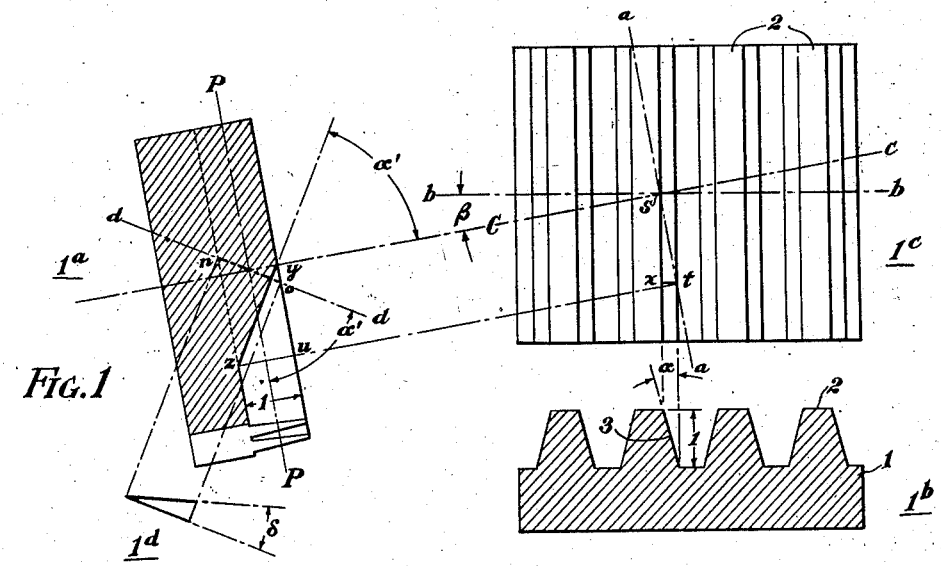
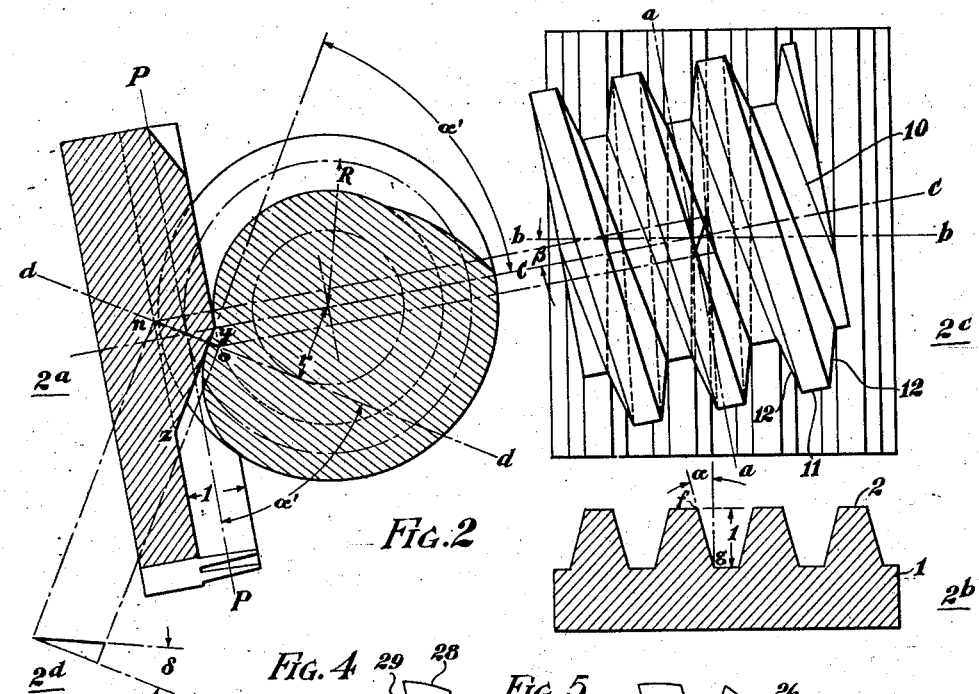
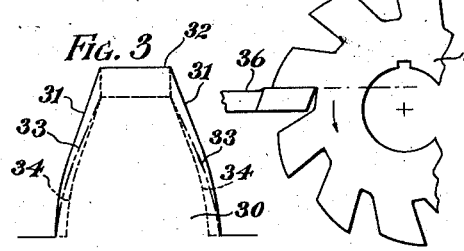
Inventor
Earle Buckingham,
By Wayne B Wells
Attorney June 9, 1925. 1,540,757
E. BUCKINGHAM
METHOD OF FORMING HELICOIDAL SURFACES
Filed March 13, 1922 2 Sheets-Sheet 2
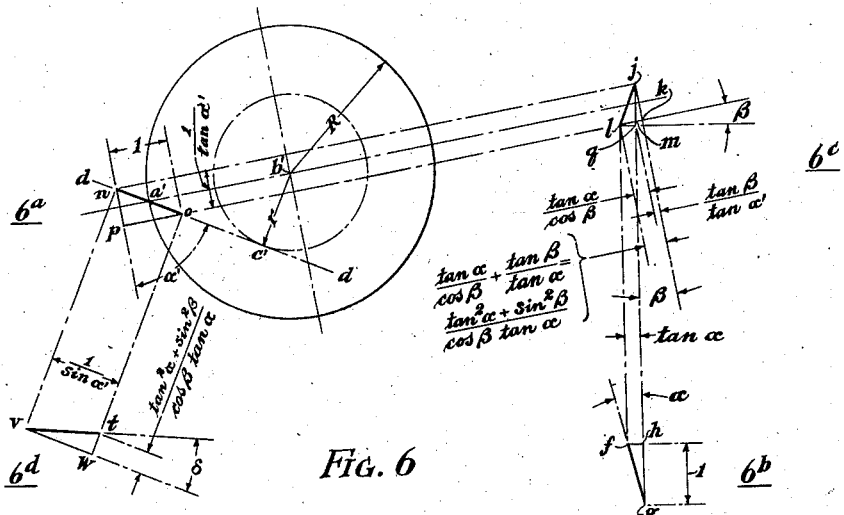

Patented June 9, 1925.

1,540,757

UNITED STATES PATENT OFFICE.

EARLE BUCKINGHAM, OF HARTFORD, CONNECTICUT, ASSIGNOR TO PRATT & WHITNEY COMPANY, OF NEW YORK, N. Y., A CORPORATION OF NEW JERSEY.

METHOD OF FORMING HELICOIDAL SURFACES.

Application filed March 13, 1922. Serial No. 543,403.

*To all whom it may concern:*

Be it known that I, EARLE BUCKINGHAM, a citizen of the United States, residing at Hartford, in the county of Hartford and State of Connecticut, have invented certain new and useful Improvements in Methods of Forming Helicoidal Surfaces, of which the following is a specification.

My invention relates to methods of forming involute helicoidal surfaces and particularly to methods of forming hobs having involute helicoidal surfaces.

One object of my invention is to provide a simple and an efficient method of forming a thread having true involute helicoidal surfaces and of cutting teeth on the thread to form a hob.

Another object of my invention is to provide a method of forming a hob which has side relieved teeth so formed that the effective contour behind the cutting surface of each tooth is the same at successive surfaces of intersection similar to the initial cutting face, whereby the teeth of the hob may be ground on the front cutting faces without changing the effective contour.

Another object of my invention is to provide a method of forming a hob which has the top of each tooth radially relieved and the sides of the teeth axially relieved, whereby the effective contour behind the cutting face of each tooth is the same at successive surfaces of intersection similar to the initial cutting face.

Another object of my invention is to provide a method of forming hobs that shall consist in forming a thread on a blank, in cutting the sides of the thread to true involute helicoids, in cutting flutes on the blank through the thread, in axially relieving the sides of the blank teeth, in radially relieving the top cutting edge of the teeth, and in grinding the cutting faces and the side cutting edges of the teeth.

A further object of my invention is to provide a method of forming hobs that shall consist in milling a thread on a blank, in cutting each side of the thread with a straight cutting edge to form true involute helicoidal surfaces, each cutting edge being maintained tangent to the base cylinder of the desired involute helicoid and at a predetermined angle to a plane perpendicular to the blank axis, in cutting flutes on the blank through the thread to form teeth, in axially relieving the sides of the teeth, in radially relieving the tops of the teeth and in grinding the cutting faces and the side cutting edges of the teeth.

Hobs, which are constructed in accordance with my invention, are particularly adapted for cutting gear wheels having involute teeth but are not necessarily limited to such operation. A gear wheel having involute teeth is adapted to mesh with a rack having straight sided teeth, and, accordingly, a hob which will cut true involute teeth on a gear wheel should also cut straight sided teeth on a rack. It has been determined, as will be hereinafter set forth, that a hob must have involute helicoidal surfaces in order to cut a gear wheel having involute teeth or a rack having straight sided teeth. The involute helicoidal surfaces of a hob, which will generate a rack having straight sided teeth or an involute gear wheel, are generated by revolving and advancing, with a uniform lead, straight cutting edges inclined at any predetermined angle to a plane perpendicular to the hob axis. The cutting edges remain tangent to a cylinder of a diameter that the helix angle of the helicoidal surfaces at such a diameter is the same as the angle between the generating cutting edges and the plane perpendicular to the hob axis. An involute helicoidal surface may be considered the surface which is obtained by rotating an involute while advancing it along the axis thereof at a uniform rate. The involute helicoid may also be stated as the surface which is obtained by screwing an involute along its axis.

The first conception of a hob for cutting gear wheels was a worm wherein an axial section is the same as the rack which is used as the basis for an involute gear wheel. Each side of such a worm is formed by a tool having a straight cutting edge making any predetermined angle with a plane perpendicular to the blank axis and extending along a line passing through the axis of the blank. The straight cutting edge is assumed to be revolved and advanced with a uniform lead. The intersection of a surface so formed and a plane perpendicular to the blank axis would be an Archimedes spiral and not an involute as is required. It is customary at the present day to form a hob by first cutting a thread in the above indicated manner and by cutting flutes on the blank through the thread to form teeth. Such teeth are radially relieved by a suitable tool.

In forming a hob in accordance with my invention, a thread is preferably first formed on the blank by means of a suitable milling cutter. The thread so formed does not have true involute helicoidal surfaces but has surfaces which approximate involute helicoids. Such thread is cut to true involute helicoidal surfaces by straight cutting edges which are tangent to the base cylinder of the desired involute helicoid and make a predetermined angle with planes perpendicular to the blank axis. One cutting edge serves to cut one side of the thread whereas the other cutting edge serves to cut the other side of the thread. Such cutting edges may, if so desired, operate simultaneously on the blank. When operating simultaneously on a blank, the cutting edges are located in the angular positions above set forth and tangent to the base cylinder of the desired involute on opposite sides of the blank axis. If so desired, the same cutting tool may be utilized for cutting a true involute helicoidal surface on each side of the thread. In such case one side of the blank thread is first cut to a true involute helicoid and then the position of the blank is reversed and the other side of the thread is cut to a true involute helicoid by the same cutting tool and the same straight cutting edge. Upon cutting the sides of the thread to true involute helicoids, suitable flutes are cut on the blank through the thread. Such flutes may be straight or spiral as desired. The inclination of the spiral flutes may be in either direction, as desired, according to the character of work being operated on. Moreover, the cutting faces of the teeth, which are formed by the flutes, may be radially or non-radially arranged, as desired.

It is customary to provide straight flutes in order to give a more even cutting action. However, straight flutes will not give such a smooth cutting action if the hob is set square with the work or the generating rack, as will be pointed out hereinafter. The hob may be set at any desired angle relative to the work. The flutes should be formed on the hob in accordance with the helix angle or lead on the hob. If the helix angle of the hob is relatively large, the use of straight flutes will result in a blunt cutting edge on one side of each hob tooth and a relatively acute angle on the other side of each tooth. In such case it is necessary to use helical cutting flutes which will be substantially perpendicular to the helix of the hob in order to maintain suitable cutting edges.

Upon forming of teeth on the hob by cutting flutes through the thread, the side cutting edges of the teeth are axially relieved and the top cutting edges are radially relieved. The axial relief on the teeth is preferably effected by means of a formed lathe tool which is matched to the form of the teeth at the side cutting edges formed by the hob flutes. Each side of the teeth is relieved by such a relieving tool in the usual and customary manner. Upon completion of the axial relief on the hob teeth, the tops of the teeth are radially relieved in the customary and usual manner. The tops of the hob teeth must be radially relieved to such an extent that the thickness of the teeth at the top is approximately uniform. When axial relief is employed, it is apparent the hob teeth must be lengthened somewhat so that the bottom of the hob will clear the outside diameter of the gear blank when the hob is somewhat worn.

After hardening, the front cutting faces of the teeth are ground in accordance with the inclination of the flutes and preferably the side cutting edges are so ground as to make very little or slight drag. It, of course, will be preferable to grind the side relieved surfaces but such operation is somewhat expensive and a slight grinding of the side cutting edges produces satisfactory results.

It has been determined that the contact surface of gear wheels, which have been cut by a hob formed in the ordinary manner, is a very narrow surface usually on or near the pitch line. In referring to a usual or ordinary hob, a hob is considered which is formed by a straight cutting edge making a predetermined angle with a plane perpendicular to the blank axis and extending along a line passing through the blank axis. Theoretically almost all of the involute profile in involute gear teeth should be in the contacting surface. Accordingly, due to the narrow bearing face on involute gears, as now constructed by the hobbing process, the permissible load on the teeth is relatively low, thus, making it necessary to use relatively wide tooth faces. It is evident that this is a serious limitation, particularly with large power units running at high pitch line velocities. The hob made with a straight line tooth profile in the ordinary manner will remove additional metal from the top and bottom portions of the involute profile although the thickness at the pitch line may be correct. The hob, which is generated in accordance with my method does not have a straight line profile at the cutting edge as the hob which is generated in accordance with the common and usual method. It has been determined, however, that the larger the diameter of the hob, the more nearly the hob tooth profile approaches a straight line. It would seem advisable to make the diameter of the hob as large as conditions will permit. However, a large hob not only costs more but the lead of larger diametered hobs is distorted more in hardening than the lead of smaller diametered hobs.

When a hob has been formed by a radially arranged cutting edge, as by the methods above set forth, it is difficult to grind and maintain the surfaces of the sides of the hob teeth. It is well known that it is not possible to grind a continuous screw thread with any degree of accuracy unless the lead of the thread is very small. The reason for the difficulty in grinding screw threads is the inability of the grinding wheel to cut along the same cutting line by which the thread is formed. If it is difficult to grind a continuous screw thread, it is apparent that a relieved screw thread, which is attempted on the sides of the hob teeth, is even more difficult to grind. Therefore, in grinding screw thread hobs, it is apparent two errors are introduced, the error of the screw thread and the error effected in attempting to grind screw threads.

In a hob constructed in accordance with my methods, the sides of the hob teeth are axially relieved to an abnormal extent for a purpose to be hereinafter set forth. Such side relieved surfaces are in the form of involute helicoids. Although a hob may be formed with teeth which will cut substantially correct involute teeth, errors are introduced during the hardening process which distort the hob teeth. In hobs which have been formed by a radially arranged cutting edge as heretofore set forth, it is a very difficult matter to so grind the hob as to eliminate the errors introduced during hardening. In a hob having teeth the side surfaces of which are in the form of true involute helicoids, the correcting of the hardening errors is greatly simplified. Although the sides of the hob teeth may be correctly ground inasmuch as they are in the form of involute helicoids, it has been found that the contour grinding of the side edges of the teeth will give very satisfactory results. The side cutting edges are ground to true involute helicoids having the same lead as the lead of the hob thread. Inasmuch as the sides of the teeth have been axially relieved to an appreciable extent, it is apparent the contour grinding will grind only a very narrow ribbon on the sides of the teeth. Such ribbon will be so narrow as not to produce any appreciable lag or drag. The front cutting faces of the teeth should be ground in the usual manner in conformity with the direction of the flutes and in conformity with the front cutting faces of the teeth. The front cutting faces of the teeth may be ground a number of times without contour grinding the side cutting edges of the teeth.

In my companion application, Serial No. 543,404 filed March 13, 1922, is disclosed and claimed, hobs which are constructed in accordance with the methods disclosed in this application.

In the accompanying drawings:

Figure 1 is a diagrammatic view showing the intersections of various planes with a rack having straight sided teeth.

Fig. 2 is a view similar to Fig. 1 showing the lines of contact between the teeth of a hob with the straight sided teeth of a rack.

Fig. 3 is a diagrammatic view comparing radial and axial relief on a tooth of a hob having true involute helicoidal surfaces.

Figs. 4 and 5 are diagrammatic views showing the positions of a formed lathe tool for axially relieving hobs having teeth provided with non-radially arranged cutting faces and teeth provided with radially relieved cutting faces.

Fig. 6 is a diagrammatic view more clearly showing the lines of contact between the teeth of the hob and the teeth of the rack shown in Fig. 2.

Fig. 7 is a diagrammatic end view of a hob and the position of the cutting edges for forming true involute helicoidal surfaces.

Fig. 8 is a partial side elevational view of the hob and cutting edges shown in Fig. 7.

Fig. 9 is a partial plan view of the hob and tools shown in Fig. 7.

Figs. 10 and 11 are respectively side elevational and end views of a hob constructed in accordance with my invention.

Fig. 12 is a diagrammatic view illustrating the lead of the hob at the pitch circle.

In referring to the drawings, a hob will be considered which will generate a rack having straight sided teeth. Although such a rack would never be constructed by a hob, it is simpler to consider a hob in connection with a rack rather than in connection with a gear wheel having involute teeth. It is well known that a rack having straight sided teeth is used as a base for a gear wheel having involute teeth. Moreover, a hob, which will cut involute teeth on a gear wheel, will also cut straight sided teeth on a rack. Although a hob consists of teeth formed in a continuous thread or threads, it is simpler to consider the continuous thread of a hob without regard to the teeth which are cut therein. Accordingly in referring to Figs. 1, 2 and 6 of the drawings, a worm or a hob without teeth formed in the thread will be considered as meshing with a rack having straight sided teeth. It is to be understood that the hob, thus considered, may have teeth of any desired shape or form which will mesh with the teeth of a rack in the same manner as a worm thread.

Referring to Fig. 1 of the drawings, three views of a rack 1 are illustrated. The rack is provided with straight sided teeth 2 such as may be used as the base for forming involute teeth on gear wheels. Fig. 1 consists of three parts or portions; a plan view; a section along the line b—b of the plan view, and a section along the line a—a of the plan view. The three parts of Fig. 1 have been respectively designated by the reference characters 1ᶜ, 1ᵇ and 1ᵃ. The line a—a is drawn perpendicularly to a line c—c which in turn may be considered the axis of a worm or hob which meshes with the teeth on the rack. The axis c—c makes an angle β with the line b—b. The line b—b is drawn in the plane of the teeth and perpendicularly to them. It also may be stated, the axis c—c makes an angle β with a vertical plane through the rack. The vertical plane is drawn perpendicularly to the direction of the rack teeth. The sides 3 of the rack teeth are considered to make an angle α with a plane perpendicular to the rack and parallel to the direction of the teeth, as shown in Fig. 1 of the drawings.

In each of Figs. 1, 2 and 6, three views of the basic rack have been shown, in order to more clearly set forth the lines of engagement between the sides of a hob thread and the sides of a rack having straight sided teeth. The projection lines in each figure have been extended to join the views in order to more clearly explain the angular setting of the lines of engagement. The parts or portions of the Figs. 2 and 6 have been designated in the same manner as the parts of Fig. 1. The parts of Fig. 2 are marked 2ᵃ, 2ᵇ, 2ᶜ and 2ᵈ and the parts of Fig. 6 are marked 6ᵃ, 6ᵇ, 6ᶜ and 6ᵈ.

The line yz in portion 1ᵃ Fig. 1 of the drawings represents the intersection of a plane along the line a—a with one side 3 of a tooth 2 of the rack. The pitch line of the rack in the part 1ᵃ of Fig. 1 of the drawings is indicated by the reference characters P—P. The line of action between the teeth on a hob (not shown in Fig. 1 of the drawings) must be along a line perpendicular to the line yz. Moreover, the line of action must pass through the pitch line P—P and must also intersect the center line or axis c—c of the hob. Therefore, the line d—d in part 1ᵃ of Fig. 1 must pass through the intersection point between the line P—P and the axis c—c and must also be perpendicular to the line yz. The portion no of the line d—d, as shown in part 1ᵃ of Fig. 1, is a line along which a side of a hob thread having an axis c—c must engage the side of a rack tooth. In brief, the portion no of the line d—d is the line of engagement between the side of a rack tooth and the side of a worm thread.

Referring to Fig. 2 of the drawings, a worm or hob 10 is shown meshing with the rack 1. The worm 10 is set at an angle β with respect to the rack 1. The worm is provided with a thread 11 having sides 12 which correctly engage the straight sides of rack 1. By using the term "correctly engage" it is intended to set forth that the worm thread so engages the sides of the rack teeth as to cut straight sided teeth if the worm is used as a hob. As heretofore set forth, the views of the rack in Fig. 2 are assumed to be similar to the views of the rack shown in Fig. 1 of the drawings.

The line d—d makes an angle α' with a horizontal plane through the rack in portion 1ᵃ, Fig. 1 of the drawings. Inasmuch as the center line c—c of the hob is perpendicular to the pitch line P—P and as the line yz is perpendicular to the line d—d, the line yz continued makes an angle α' with the center line c—c. The projection of the line of engagement no between the hob thread and the side of the rack tooth from part 2ᵃ to part 2ᶜ of Fig. 2 is shown on the side of a rack tooth in portion 2ᶜ of Fig. 2. The line of engagement between the rack and one side of the hob thread in part 2ᵇ of Fig. 2 is indicated by one side fg of a rack tooth. In order to show the angle which the line of engagement makes with a plane perpendicular to the axis c—c of the hob, a section is taken along the line d—d in part 2ᵃ of Fig. 2. The section so taken is part 2ᵈ of Fig. 2. The angle made by the line of engagement is indicated by the reference character δ in part 2ᵈ of Fig. 2.

Referring to Fig. 2 of the drawings, it is apparent the pitch circle of the hob must engage the pitch line P—P of the rack at the point of intersection between the pitch line P—P and the line c—c. The radius of the pitch circle is taken equal to R. In Figs. 1 and 2 of the drawings, only one line of engagement between the hob thread and the straight sided tooth of the rack has been considered. However, it is apparent that any other section taken parallel to the section along the line a—a at a different position along the axis c—c of the hob will show a similar line no of engagement between the side of the hob thread and the side of a rack tooth.

The line of engagement between the straight sided tooth of a rack and the side of a thread on a worm must be a straight line if all parts of the side of the tooth are engaged by the thread of the worm at some time during its movement. Moreover, it may be stated that if a straight cutting edge is located with respect to a blank in a position similar to the position of the line no part 1ᵃ Fig. 1, a side of a thread will be cut on the blank. The side of the thread, thus cut on the blank, will mesh with a rack having straight sided teeth. During the cutting of the thread on the blank, the blank is assumed to rotate at a uniform rate and the cutting edge is assumed to be moved axially along the blank in timed relation to the rotation thereof.

Referring to Figs. 1 and 2 and particularly to part 1ª and 2ª in such figures, it will be noted the line $d$—$d$ always makes an angle $\alpha'$ with a horizontal plane. Therefore, the line $d$—$d$ is always tangent to a base cylinder of a radius $r$, as shown in part 2ª, Fig. 2 of the drawings. From the above statements, it is apparent the side surface of the thread on a worm, which correctly meshes with the straight sided teeth of a rack, must be involute helicoidal surfaces. An involute helicoidal surface may be considered as the surface which is generated by rotating an involute while advancing it at a uniform rate along its axis. An involute helicoidal surface may also be stated as the surface which is obtained by screwing an involute along its axis. Moreover, it may be stated that the side surface of a hob, which will generate a rack having straight sided teeth or a gear wheel having involute teeth, is generated by revolving and advancing, with a uniform lead, a straight cutting edge inclined at any given angle to a plane perpendicular to the blank axis. The cutting edge must remain tangent to a cylinder of a predetermined diameter. As will be hereinafter set forth and shown, the diameter of the base cylinder is such that the helix angle of the hob thread at that diameter is the same as the angle between the generating line or cutting edge and a plane perpendicular to the hob axis.

When a section of an involute helicoid is taken perpendicular to the axis thereof, an involute will always be obtained. The involute curve thus obtained is shown in part 2ª of Fig. 2. If a like section were taken on a screw thread hob, which has been made in the customary manner, an Archimedes spiral would be shown in place of an involute. For a further explanation of the properties of an involute helicoid, reference may be made to the pending application of Ernest Wildhaber, Serial No. 543,385, filed March 13, 1922, and also to my book "Involute Spur Gears" published in 1922 by the Niles-Bement-Pond Company.

Referring particularly to Fig. 6 of the drawings, the position of the line of engagement between a hob and a rack will be determined in values of known terms. In Fig. 6 the line of engagement has been shown in the various projection planes free from the rack or the hob. The line of engagement in its various projections in Figs. 1, 2 and 6 has been shown in heavy lines, the terms used in determining the position of the line of engagement and the value of the angle $\delta$ are as follows:

$r$=radius of the base cylinder of an involute helicoid;

$R$=radius of the pitch circle of worm or hob;

$\alpha$=angle of the straight side of the tooth of the generating rack;

$\beta$=angle which the worm or hob makes with the rack;

$\beta$=helix angle of the hob at the radius R;

$\alpha'$=pressure angle of the involute in parts 1ª, 2ª and 6ª of Figs. 1, 2 and 6. (The angle $\alpha'$ is the projected angle of $\alpha$ in parts 1ª, 2ª and 6ª, Figs. 1, 2 and 6);

P=circular pitch of rack;

K=lead of the hob.

In portion 6ᵇ of Fig. 6, a triangle $fgh$ may be formed on the line of engagement between the hob thread and the rack. The line lies in the plane of one side of a rack tooth. The angle $fgh$ is equal to $\alpha$, as heretofore set forth. The side $gh$, which is equal to the height of one of the rack teeth, is taken equal to 1.

Therefore, $fh = \tan \alpha$.

In the portion 6ᶜ of the drawings, a triangle $jkl$ may be formed on the line of engagement. The line $jk$ is considered to be drawn perpendicularly to the axis $c$—$c$ of the hob, as shown in Fig. 2 of the drawings. The base $lk$ of the triangle $jkl$ is drawn parallelly to the axis $c$—$c$ of the hob and perpendicularly to the line $jk$. The base line $lk$ of the triangle $jkl$ is divided by a line $jm$. The line $jm$ is so drawn that the angle $kjm$ is equal to the angle $\beta$. The line $jm$ may be considered a continuation of the line $gh$ which forms a part of the triangle $fgh$. The line $lk$ may be considered as composed of two parts, namely, $lm$ and $mk$.

It will be shown hereinafter, $$lm = \frac{\tan \alpha}{\cos \beta}$$

and $$mk = \frac{\tan \beta}{\tan \alpha'}.$$

In the portions 6ª of Fig. 6, a triangle $nop$ may be formed on the line of engagement. The line $po$ is drawn parallelly to the axis $c$—$c$ of the hob and the line $np$ is drawn perpendicularly to the line $po$. It is apparent the angle $pno$ formed between the line $on$ and $pn$ is equal to the angle $\alpha'$. Moreover, it is apparent the line $po$ is equal to numeral 1, the depth of a rack tooth.

Solving the above triangle $nop$, it is clear, $$np = \frac{1}{\tan \alpha'}$$

and $$no = \frac{1}{\sin \alpha'}.$$

The triangle $jkm$, which is a part of the triangle $jkl$ in Fig. 6 of the drawings, may be solved to obtain the length of the line $mk$.

Angle $klm$ = angle $\beta$.

$$jk = np = \frac{1}{\tan \alpha'}.$$

$$\tan \beta = \frac{mk}{jk} = mk \div \frac{1}{\tan \alpha'}.$$

Therefore, $$mk = \frac{\tan \beta}{\tan \alpha'}.$$

The length of the line $lk$ may be obtained by solving the triangle $lmq$ in Fig. 6 of the drawings. The side $mq$ of the triangle is drawn as a continuation of the line $jm$ and the line $lq$ is drawn perpendicularly to the line $mq$. The angle formed by the line $ml$ and the line $ql$ is equal to the angle $\beta$.

$$lq = fh = \tan \alpha.$$

Solving the triangle $lmq$, $$\cos \beta = \frac{\tan \alpha}{lq}.$$

Therefore, $$lq = \frac{\tan \alpha}{\cos \beta}.$$

The line $lk$ of the triangle $jkl$ is equal to the line $lm$ + the line $mk$.

Therefore, $$lk = lm + mk = \frac{\tan \alpha}{\cos \beta} + \frac{\tan \beta}{\tan \alpha'}.$$

By solving the above equation, it may be shown that—

$$lk = \frac{\tan^2 \alpha + \sin^2 \beta}{\cos \beta \tan \alpha}$$

Referring to the triangles $yzu$ and $stx$ shown in portions 1ª and 1ᶜ, Fig. 1 of the drawings, it will be shown that—

$$\tan \alpha' = \frac{\tan \alpha}{\sin \beta}.$$

In the triangle $stx$ the line $xt$ is drawn perpendicularly to the line $sx$ and the line $st$ is drawn perpendicularly to the axis $c$—$c$ of the hob. In the triangle $yzu$, the angle $yzu$ is equal to the angle $\alpha'$. The side $zu$ of the triangle $yzu$ is equal to the height of the rack tooth which has been taken equal to the numeral 1.

Consequently, $$\tan \alpha' = \frac{yu}{1} = yu,$$

$yu = st$ (in triangle $stx$), $xt = fh$ (in triangle $fgh$ Fig. 6) = $\tan \alpha$, and $$\sin \beta = \frac{xt}{st} = \frac{\tan \alpha}{\tan \alpha'}.$$

Therefore, $$\tan \alpha' = \frac{\tan \alpha}{\sin \beta}.$$

Substituting the value of $\tan \alpha'$, thus obtained, in the equation for the line $lk$ above set forth, we obtain:

$$lk = \frac{\tan \alpha}{\cos \beta} + \frac{\tan \beta}{\tan \alpha'} =$$

$$\frac{\tan \alpha}{\cos \beta} + \frac{\tan \beta}{1} \times \frac{\cos \beta \tan \beta}{\tan \alpha} =$$

$$\frac{\tan \alpha}{\cos \beta} + \frac{\sin \beta \tan \beta}{\tan \alpha} = \frac{\tan^2 \alpha + \sin^2 \beta}{\cos \beta \tan \alpha}.$$

A triangle $vtw$ may be formed on the line of engagement in portion 6ᵈ of Fig. 6. The line $vw$ is taken parallel to the line $d$—$d$ in portion 6ª of Fig. 6 and the line $tw$ is drawn perpendicularly to the line $vw$. The angle $tvw$ is designated by the sign $\delta$. The angle $\delta$ is the angle between the line of engagement and a plane perpendicular to the blank or hob axis.

Referring to the former equations, it was shown, $$vw = no = \frac{1}{\sin \alpha'}$$

and $$wt = lk \text{ (in triangle } jkl) = \frac{\tan^2 \alpha + \sin^2 \beta}{\cos \beta \tan \alpha}.$$

Therefore, $$\tan \delta = \frac{wt}{vw} = \frac{\frac{\tan^2 \alpha + \sin^2 \beta}{\cos \beta \tan \alpha}}{\frac{1}{\sin \alpha'}} =$$

$$\frac{(\tan^2 \alpha + \sin^2 \beta) \sin \alpha'}{\cos \beta \tan \alpha}.$$

In solving triangles $yzv$ and $stx$, Fig. 1, it is shown—

$$\tan \alpha' = \frac{\tan \alpha}{\sin \beta}$$

and $$\frac{\sin \alpha'}{\cos \alpha'} = \frac{\tan \alpha}{\sin \beta}.$$

In the triangle $a'$ $b'$ $c'$, portion 6ª of Fig. 6, it is apparent—

$$\cos \alpha' = \frac{r}{R}.$$

Therefore, $$\sin \alpha' = \frac{r}{R} \frac{\tan \alpha}{\sin \beta}.$$

Substituting the value of $\sin \alpha'$ in the above equation, $$\tan \delta = \frac{(\tan^2 \alpha + \sin^2 \beta) \sin \alpha'}{\cos \beta \tan \alpha} =$$

$$\frac{(\tan^2 \alpha + \sin^2 \beta)}{\cos \beta \tan \alpha} \frac{r}{R} \frac{\tan \alpha}{\sin \beta} =$$

$$\frac{r}{R} \frac{(\tan^2 \alpha + \sin^2 \beta)}{\sin \beta \cos \beta},$$

However, $$\tan \alpha' = \frac{\tan \alpha}{\sin \beta} \text{ and } \tan^2 \alpha = \sin^2 \beta \tan^2 \alpha'.$$

Substituting the above equation, $$\tan \delta = \frac{r(\tan^2 \alpha + \sin^2 \beta)}{R \sin \beta \cos \beta} = \frac{r \sin \beta (\tan^2 \alpha' + 1)}{R \cos \beta} = \frac{r \tan \beta (\tan^2 \alpha' + 1)}{R}.$$

In Fig. 12 a triangle is shown formed with one side equal to the lead K, and another side equal to $2\pi R$, the circumference of the hob at the pitch circle. The angle of such triangle opposite the side K must be equal to $\beta$.

Accordingly, $$\tan \beta = \frac{K}{2\pi R}.$$

Substituting in the above equation, $$\tan \delta = \frac{r \tan \beta (\tan^2 \alpha' + 1)}{R} = \frac{rK (\tan^2 \alpha' + 1)}{2\pi R^2}.$$

However, $$\tan^2 \alpha' + 1 = \frac{\sin^2 \alpha' + \cos^2 \alpha'}{\cos^2 \alpha'} = \frac{1}{\cos^2 \alpha'}.$$

Substituting in the above equation, $$\tan \delta = \frac{rK (\tan^2 \alpha' + 1)}{2\pi R^2} = \frac{rK}{2\pi R^2 \cos^2 \alpha'}.$$

However, it is apparent from the triangle $a'b'c'$, Fig. 6, that—

$$\cos \alpha' = \frac{r}{R} \text{ and } r = R \cos \alpha'.$$

Substituting in the above equation $$\tan \delta = \frac{rK}{2\pi R^2 \cos^2 \alpha'} = \frac{K}{2\pi r}.$$

From the above equation the value of the angle $\delta$ is determined for setting the cutting edge to cut a true involute helicoid on the side of a hob thread. It should be noted that the tangent of the angle $\delta$ is given in terms of the lead and of the radius of the base cylinder for the involute helicoid. The angle $\delta$, as heretofore set forth, is the angle between the cutting edge and a plane perpendicular to the hob or blank axis. Attention is called to the fact that the tangent of the helix angle of a hob at radius $r$ is equal to $$\frac{K}{2\pi r}.$$

Therefore, the surface of a hob, which will generate a straight sided rack or a gear wheel having involute teeth, is generated by revolving and advancing with a uniform lead, a straight line inclined at any tangent angle with a plane perpendicular to the axis, this line remaining tangent to a cylinder of such a diameter that the helix angle at that diameter is the same as the angle between the generated plane and a plane perpendicular to the blank axis. The above feature of involute helicoidal surfaces makes it comparatively simple to calculate hobs and also helical and spiral gears whose surfaces are involute helicoids.

The angle $\beta$ between the hob and the work may be varied at will within certain practical limits. Reference may be made to my book "Involute Spur Gears", above referred to, for a further description as to the effect of varying the value of the angle $\beta$. It may be noted that if so desired, the angle $\beta$ may be taken equal to zero. In such latter case, the hob is set square with the work being operated on.

Regardless of the angular setting of the hob, the same general characteristics of the profile remain identical. In other words, the profiles of the cutting edges of the hob must be involute helicoidal surfaces. A hob, which is set square with the face of a spur gear blank, is identical in all essentials with a hob which is set at an angle with respect to the blank. The only difference in the two hobs is the change in the pressure angle, pitch and thickness of space between the teeth.

Referring to Figs. 3, 4, 5, 7, 8 and 9 of the drawings, a method will be described for forming a hob such as shown in Figs. 10 and 11 of the drawings. In Figs. 7, 8 and 9, a hob blank 15 is shown adapted to rotate on an axis D—D. The blank is shown provided with a thread 16 having sides 17. The thread 16 may be formed on the blank in any suitable manner and preferably is formed either by a lathe tool having a radial cutting edge or by a formed milling cutter. A thread so formed does not have true involute helicoidal sides but has sides which approximate involute helicoids. Two cutting tools 18 and 19 are shown in position for engaging opposite sides of the thread 16 on the hob blank 15. The cutting tool 18 is shown positioned a distance $r$ above the axis of the blank and the cutting tool 19 is positioned a distance $r$ below the axis of the blank. The reference character $r$ is assumed to be the radius of the base cylinder for the desired involute helicoids. When the cutting tools 18 and 19 are so positioned, it is evident, as shown in Fig. 7 of the drawings, that the cutting edges are tangent to a base cylinder having a radius $r$. No means is shown in the drawings for supporting and for effecting rotation of the blank 15 or for supporting the cutting tools 18 and 19. It is assumed that any suitable machine may be provided for practicing my methods. The showing of a suitable machine for performing the methods would needlessly complicate the drawings and is not deemed to be necessary. As shown in Fig. 9 of the drawings, the cutting edge of each of the tools 18 and 19 is set to make a predetermined angle $\delta$ with a plane perpendicular to the blank axis. The necessity for setting the cutting edges at such angle $\delta$ has been described heretofore. If the blank 15 is rotated at a uniform rate and the cutting tools 18 and 19 are moved axially along the blank in timed relation to the blank rotation, true involute helicoidal sides will be cut on the thread 16.

Upon completion of the involute helicoids on the sides of the thread 16, suitable flutes, such as the straight flutes 20 shown in Figs. 10 and 11 of the drawings, are cut through the thread 16. It is not essential to cut the flutes through the thread after forming of the involute helicoids on the sides of the teeth. The flutes may be formed on the blank prior to the forming of the thread 16, if so desired.

The Figs. 10 and 11 of the drawings show a completed hob 21 and will be utilized in describing the steps necessary in forming a hob. The flutes 20 shown in Figs. 10 and 11 are parallel to the axis of the hob 21, but if so desired, spiral flutes which are inclined in either direction may be cut through the thread for forming teeth 22. The teeth 22 thus formed in the thread are provided with unrelieved sides which are in the form of true involute helicoids. It may be noted that the flutes, which are cut through the blank thread, may form either radially arranged or non-radially arranged cutting faces on the teeth. In Fig. 11 of the drawings, the teeth 22 are shown provided with non-radially arranged cutting faces 23. In Fig. 5 of the drawings, a hob 24 is shown provided with teeth 25 having radially arranged cutting faces 26. In Fig. 4 of the drawings, a hob 27 is shown provided with teeth 28 having non-radially arranged cutting faces 29.

It is necessary to relieve the teeth of a hob and such relief may be either the so-called radial or the so-called axial or side relief. In precision hobs of the type being considered, it is essential to relieve the sides of the teeth by the so-called axial relief in order to obtain the same effective contour behind the cutting surface of each tooth at successive surfaces of intersection similar to the initial cutting face, whereby the teeth on the hob may be ground on the front cutting faces without changing their effective contour.

Referring to Fig. 3 of the drawings, a tooth 30 is shown having sides 31 and a top 32. The dot and dash lines 33 indicate the rear side edges of the tooth if the sides 31 are relieved by the so-called radial relief and the dot and dash lines 34 indicate the rear side edges of the tooth if the sides 31 are relieved by the so-called axial relief. Although a hob having the sides of the teeth relieved by the so-called radial relief will cut a correct profile when the hob is new, it is apparent that an incorrect profile will be cut when the hob is reground. If the sides of the teeth are relieved by the so-called axial relief, the tops of the teeth may be so relieved by the so-called radial relief as to maintain the width of the tops of the teeth substantially constant. In such case the teeth may be ground on their front cutting faces without changing the effective contour cut by them. If the sides of the hob teeth are provided with the so-called axial relief, it is necessary to lengthen the teeth somewhat in order to prevent interference with the bottom of the flute when the teeth are ground back somewhat.

Preferably, if a hob is constructed in accordance with my methods, the sides of the teeth are axially relieved. The correct profiles of the relieved surfaces depend upon the character of the flutes which are formed on the blank. As heretofore stated, the flutes may be straight or spiral and may form either radially arranged or non-radially arranged cutting faces on the teeth. Referring to Fig. 5, a cutting tool 35 is shown in position for relieving one side of a tooth 25 of the hob blank 24. The cutting edge of the tool 35 is aligned with the front cutting face 26 of one of the teeth 24 and is ground to match the side cutting edge of such tooth. With the cutting tool in such position, the teeth are relieved in the customary and usual manner. It will be noted the cutting edge is radially arranged with respect to the blank axis. If the teeth of the hob are provided with non-radially arranged cutting faces, the position of the relieving tool must be changed. Referring to Fig. 4 of the drawings, a cutting tool 36 is shown in position for relieving the teeth 28 on the hob blank 27. The cutting edge of the tool 36 is placed above the axis of the hob 27 so that such edge is parallel to the front cutting face of one of the teeth 28. The cutting edge of the tool 36 is matched to one cutting edge of the tooth on the hob blank. One side of each tooth is then relieved by relieving movements which are effected in the usual and customary manner. The inclination of the flutes relative to the blank axis is taken care of by matching the relieving tool to the cutting edges of the hob teeth. Upon relieving one side of the hob teeth in the above indicated manner, the opposite side of the teeth are relieved in a similar manner.

The tops of the hob teeth are radially relieved in the customary and usual manner. Preferably, the tops of the teeth are so relieved as to maintain the width of the top of each tooth substantially constant.

After hardening a blank, which has been formed in the above indicated manner, it is necessary to grind the teeth in order to compensate for the errors effected during hardening. It is possible to grind the sides of the teeth, which are in the form of involute helicoids, but such an operation is somewhat expensive. However, it has been found that after grinding the front cutting faces of the teeth, the side cutting edges of the teeth may be slightly contour ground without producing any appreciable drag. Inasmuch as the teeth are axially relieved to more than a normal amount, it is apparent the contour grinding of the side cutting edges will only produce a narrow ribbon of ground surface on the sides of the teeth. The ribbon of ground surface is generally about one thirty-second of an inch in width. Such contour grinding may be effected by placing plane grinding wheels 38 and 39 in the position shown in Fig. 10 of the drawings. The grinding wheels 38 and 39 are respectively provided with grinding surfaces 40 and 41. The grinding surfaces 40 and 41 bear the same relation to the sides of the hob teeth as the sides of the rack 1 in Fig. 2 bear to the sides 12 of the thread 11 on the hob 10. The narrow ribbons of ground surface 42, which are formed on the teeth 21 of the hob shown in Figs. 10 and 11 of the drawings, will have a lead corresponding to the lead of the hob thread and not a lead corresponding to either of the relieved sides of the hob teeth. For a further description as to the step of contour grinding the sides of the hob teeth, reference may be had to the application of Ernest Wildhaber above referred to.

It will be understood that such changes and modifications may be made in my invention as fall within the limits of the appended claims.

What I claim is:

1. The method of forming involute helicoidal surfaces, which consists in rotating a blank, and in moving straight cutting edges along the blank in timed relation to the blank rotation to form a thread having involute helicoidal surfaces, each of the said cutting edges being placed to make a predetermined angle with a plane perpendicular to the blank axis and tangent to the base cylinder of the desired involute helicoid.

2. The method of forming involute helicoidal surfaces, which consists in rotating a blank, and in moving straight cutting edges along the blank in timed relation to the blank rotation to form a thread having involute helicoidal surfaces, each of said cutting edges being placed to make a predetermined angle with a plane perpendicular to the blank axis and tangent to the base cylinder of the desired involute helicoid, said predetermined angle being dependent on the lead and the radius of the base cylinder of the desired involute helicoid.

3. The method of forming involute helicoidal surfaces, which consists in rotating a blank, in forming an involute helicoidal surface by moving a straight cutting edge along the blank, said straight cutting edge being maintained tangent to the base cylinder of the desired involute helicoid and at a predetermined angle with a plane perpendicular to the axis of the blank and said predetermined angle being dependent on the lead and the radius of the base cylinder of the desired involute helicoid, and in cutting a second involute helicoidal surface in a similar manner to form a thread having involute helicoidal sides.

4. The method of forming involute helicoidal surfaces, which consists in rotating a blank, in providing a tool having one straight cutting edge which is tangent to the base cylinder of the desired involute helicoid and makes a predetermined angle with a plane perpendicular to the axis of the blank, said predetermined angle being dependent on the lead and the radius of the base cylinder of the desired involute helicoid, in moving the tool along the blank to form an involute helicoidal surface, in reversing the position of the rotating blank, and in moving the tool along the rotating blank for cutting a second involute helicoidal surface.

5. The method of forming involute helicoidal surfaces, which consists in rotating a blank, in providing a tool having one straight cutting edge which is tangent to the base cylinder of the desired involute helicoid and makes a predetermined angle with a plane perpendicular to the axis of the blank, said predetermined angle being dependent upon the lead and radius of the base cylinder of the desired involute helicoid, in moving the tool along the blank in timed relation to the blank rotation for forming an involute helicoidal surface, in reversing the position of the rotating blank, and in again moving the tool along the blank in timed relation to the blank rotation for cutting a second involute helicoidal surface.

6. The method of forming involute helicoidal surfaces, which consists in rotating a blank, in axially feeding a milling cutter along the rotating blank to form a thread having approximate involute helicoidal surfaces, and in forming involute helicoidal surfaces on said thread by subjecting each side of the thread to a straight cutting edge which is maintained tangent to the base cylinder of the desired involute helicoid and makes a predetermined angle with a plane perpendicular to the axis of the blank while being moved along the blank.

7. The method of forming involute helicoidal surfaces, which consists in rotating a blank, in axially feeding a milling cutter along the rotating blank to form a thread having approximate involute helicoidal surfaces, and in forming involute helicoidal surfaces on said thread by subjecting each side of the thread to a straight cutting edge which is maintained tangent to the base cylinder of the desired involute helicoid and makes a predetermined angle with a plane perpendicular to the axis of the blank while being moved along the blank, said predetermined angle being dependent on the lead and the radius of the base cylinder of the desired involute helicoid.

8. The method of forming a thread having involute helicoidal surfaces, which consists in rotating a blank, in providing a cutting tool having a straight cutting edge which makes a predetermined angle with a plane perpendicular to the blank axis and is tangent to the base cylinder of a desired involute helicoid, in moving said tool along the blank in timed relation to the blank rotation to cut an involute helicoidal surface, in providing a second tool having a straight cutting edge which makes the same predetermined angle with a plane perpendicular to the blank axis and is tangent to the base cylinder of the desired involute helicoid, the two straight cutting edges being tangent to the base cylinder on opposite sides of the blank axis, and in moving the second tool along the blank in the same timed relation as the first tool.

9. The method of forming a hob, which consists in rotating a blank, in forming a thread on the blank having helicoidal surfaces, in cutting flutes on the blank through the thread, and in side relieving the helicoidal surfaces on the sides of the teeth by a constant relief while maintaining the lead unchanged, whereby the effective contour behind each cutting surface is the same at successive surfaces of intersection similar to the initial cutting face.

10. The method of forming a hob, which consists in rotating a blank, in forming a thread on the blank having involute helicoidal surfaces, in cutting flutes on the blank through the thread, and in side relieving the involute helicoidal surfaces on the sides of the teeth, whereby the effective contour behind each cutting surface is the same at successive surfaces of intersection similar to the initial cutting face.

11. The method of forming a hob, which consists in cutting a blank to form a thread having involute helicoidal surfaces, in cutting flutes on the blank through the thread, in side relieving the involute helicoidal surfaces on the sides of the teeth, whereby the effective contour behind each cutting surface is the same at successive surfaces of intersection similar to the initial cutting face, and in grinding the front cutting faces and the side cutting edges of the teeth.

12. The method of forming a hob, which consists in rotating a blank, in forming a thread having helicoidal surfaces, in cutting flutes on the blank through the thread, in side relieving the sides of the teeth, by a constant relief while maintaining the lead unchanged, and in radially relieving the tops of the teeth so that the effective contour behind each cutting surface is the same at successive surfaces of intersection similar to the initial cutting face.

13. The method of forming a hob, which consists in rotating a blank, in cutting a blank to form a thread having involute helicoidal surfaces, in cutting flutes on the blank through the thread, in side relieving the sides of the teeth, and in radially relieving the tops of the teeth so that the effective contour behind each cutting surface is the same at successive surfaces of intersection similar to the initial cutting face.

14. The method of forming a hob, which consists in rotating a cylindrical blank, in forming a thread having involute helicoidal sides by moving straight cutting edges along the blank in timed relation to the blank rotation, each of said cutting edges being tangent to the base cylinder of the desired involute helicoid and making a predetermined angle with a plane perpendicular to the blank axis, in cutting flutes on a blank to form teeth, in side relieving the sides of the teeth, and in radially relieving the tops of the teeth.

15. The method of forming a hob, which consists in rotating a blank, in cutting a thread having helicoidal surfaces, in cutting flutes on the blank through the thread, in providing a formed cutting tool having a cutting edge shaped to the edge formed by the flutes and one of the helicoidal surfaces, in so setting the cutting tool relative to the blank teeth that the cutting edge of the tool matches the cutting edge on one side of each blank tooth, in feeding the cutting tool along the blank in accordance with the lead of the thread while effecting relieving movements, and in relieving the opposite side of each tooth in a similar manner.

16. The method of forming a hob, which consists in rotating a blank, in cutting the blank to form a thread having involute helicoidal surfaces, in cutting flutes on the blank through the thread, in providing a formed cutting tool having a cutting edge shaped to the edge formed by the flutes and one of the involute helicoidal surfaces, in so setting the cutting tool relative to the blank teeth that the cutting edge on the tool matches the cutting edge on one side of each blank tooth, in feeding the tool along the blank in accordance with the lead of the thread while effecting relieving movements, and in relieving the opposite side of each tooth in a similar manner.

17. The method of forming a hob, which consists in rotating a blank, in cutting the blank to form a thread having involute helicoidal surfaces, in cutting flutes on the blank through the thread, in providing a formed cutting tool having a cutting edge shaped to the edge formed by the flutes and one of the helicoidal surfaces, in so setting the cutting tool relative to the blank teeth that the cutting edge on the tool matches the cutting edge on one side of the blank teeth, and in feeding the tool along the blank in accordance with the pitch of the blank while effecting relieving movements, in relieving the opposite side of each tooth in a similar manner, and in grinding the front cutting faces and the side cutting edges of the teeth.

18. The method of forming a hob, which consists in rotating a blank, in forming a thread on a blank having helicoidal surfaces, in cutting straight flutes on the blank through the thread to form teeth having non-radially arranged cutting faces, in providing a formed cutting tool having a cutting edge shaped to the edge formed by the flutes on one of the helicoidal surfaces, in so setting the cutting tool relative to the blank teeth that the cutting edge of the tool matches the cutting edge on one side of each blank tooth, in feeding the tool along the blank in accordance with the pitch of the thread while effecting relieving movements, and in relieving the opposite side of each tooth in a similar manner.

19. The method of forming a hob, which consists in rotating a blank, in cutting the blank to form a thread on the blank having involute helicoidal surfaces, in cutting straight flutes on the blank through the thread to form teeth having non-radially arranged cutting faces, in providing a formed cutting tool having a cutting edge shaped to the edge formed by the flutes on one of the involute helicoidal surfaces, in so setting the cutting tool relative to the blank teeth that the cutting edge of the tool matches the cutting edge on one side of each blank tooth, in feeding the tool along the blank in accordance with the pitch of the thread while effecting relieving movements, and in relieving the opposite side of each tooth in a similar manner.

20. The method of forming a hob, which consists in rotating a blank, in cutting the blank to form a thread having involute helicoidal surfaces, in cutting flutes on the blank through the thread, in providing a formed cutting tool having a cutting edge shaped to the edge formed by the flutes and one of the involute helicoidal surfaces, in so setting the cutting tool relative to the blank teeth that the cutting edge on the tool matches the cutting edge on one side of each blank tooth, in feeding the tool along the blank in accordance with the pitch of the thread while effecting side relieving movements, and in relieving the opposite side of each tooth in a similar manner.

21. The method of forming a hob, which consists in rotating a blank, in forming a thread having helicoidal surfaces, in cutting straight flutes on the blank through the thread to form teeth having non-radially arranged cutting faces, in providing a formed cutting tool having a cutting edge shaped to the edge formed by the flutes on one of the helicoidal surfaces, in so setting the cutting tool relative to the blank teeth that the cutting edge of the tool matches the cutting edge on one side of each blank tooth, in feeding the tool along the blank in accordance with the pitch of the thread while effecting side relieving movements, and in relieving the opposite side of each tooth in a similar manner.

22. The method of forming a hob, which consists in rotating a blank, in cutting the blank to form a thread having involute helicoidal surfaces, in cutting straight flutes on the blank through the thread to form teeth having non-radially arranged cutting faces, in providing a formed cutting tool having a cutting edge shaped to the edge formed by the flutes on one of the involute helicoidal surfaces, in so setting the cutting tool relative to the blank teeth that the cutting edge of the tool matches the cutting edge on one side of each blank tooth, in feeding the tool along the blank in accordance with the pitch of the thread while effecting side relieving movements, and in relieving the opposite side of each tooth in a similar manner.

23. The method of forming a hob, which consists in rotating a blank, in cutting the blank to form a thread having involute helicoidal surfaces, in cutting flutes on the blank through the thread to form teeth having non-radially arranged cutting faces, in providing a formed cutting tool having a cutting edge shaped to the edge formed by the flutes on one of the involute helicoidal surfaces, in so setting the cutting tool relative to the blank teeth that the cutting edge of the tool matches the cutting edge on one side of each blank tooth, in feeding the tool along the blank in accordance with the pitch of the thread while effecting side relieving movements, in relieving the opposite side of each tooth in a similar manner, and in radially relieving the top edge of the teeth on the blank.

24. The method of forming a hob, which consists in rotating a blank, in cutting the blank to form a thread having helicoidal surfaces, in cutting straight flutes on the blank through the thread to form teeth having non-radially arranged cutting faces, in providing a formed cutting tool having the cutting edge shaped to the edge formed by the flutes of one of the helicoidal surfaces, in so setting the cutting tool relative to the blank teeth that the cutting edge of the tool matches the cutting edge on one side of each blank tooth, in feeding the tool along the blank in accordance with the pitch of the thread while effecting side relieving movements, in relieving the opposite side of each tooth in a similar manner, in radially relieving the top side of each of the teeth on the blank, and in grinding the front cutting faces and the side cutting edges of the teeth.

25. The method of forming a hob, which consists in rotating a blank, in cutting the blank to form a thread having involute helicoidal surfaces, in cutting straight flutes on the blank through the thread to form teeth having non-radially arranged cutting faces, in providing a formed cutting tool having a cutting edge shaped to the edge formed by the flutes on one of the involute helicoidal surfaces, in so setting the cutting tool relative to the blank teeth that the cutting edge of the tool matches the cutting edge on one side of each blank tooth, in feeding the tool along the blank in accordance with the pitch of the thread while effecting side relieving movements, in relieving the opposite side of each tooth in a similar manner, in radially relieving the top edge of the teeth on the blank, and in grinding the front cutting faces and the side cutting edges of the teeth.

26. The method of forming a hob, which consists in rotating a blank, in providing a cutting tool in engagement with the rotating blank, said cutting tool having one straight cutting edge tangent on one side of the blank axis to the base cylinder of a desired involute helicoid and making a predetermined angle with a plane perpendicular to the blank axis, in moving said cutting tool along the blank to form an involute helicoidal surface, in moving a cutting edge along the blank to form a second involute helicoidal surface having the same lead as the other helicoidal surface, said last cutting edge being tangent, on the side of the blank axis opposite to the first cutting position, to the base cylinder of the desired involute helicoid and makes a predetermined angle with a plane perpendicular to the blank axis, in cutting flutes on the blank through said helicoidal surfaces to form teeth, and in relieving the teeth formed by said flutes.

27. The method of forming a hob, which consists in rotating a blank, in providing a cutting tool in engagement with the rotating blank, said cutting tool having one straight cutting edge tangent on one side of the blank axis to the base cylinder of a desired involute helicoid and making a predetermined angle with a plane perpendicular to the blank axis, in moving said cutting tool along the blank to form an involute helicoidal surface, in moving a cutting edge along the blank to form a second involute helicoidal surface having the same lead as the other helicoidal surface, said last cutting edge being tangent, on the side of the blank axis opposite to the first cutting position, to the base cylinder of the desired involute helicoid and makes a predetermined angle with a plane perpendicular to the blank axis, in cutting flutes on the blank through said helicoidal surfaces to form teeth, and in side relieving the cutting edges of the teeth formed by said flutes so that the effective contour behind each cutting surface is the same at successive surfaces of intersection similar to the initial cutting face whereby the blank may be ground on the front cutting face without changing the effective contour.

28. The method of forming a hob, which consists in rotating a blank, in providing a cutting tool in engagement with the rotating blank, said cutting tool having one straight cutting edge tangent on one side of the blank axis to the base cylinder of a desired involute helicoid and making a predetermined angle with a plane perpendicular to the blank axis, in moving said cutting tool along the blank to form an involute helicoidal surface, in moving a cutting edge along the blank to form a second involute helicoidal surface having the same lead as the other helicoidal surface, said last cutting edge being tangent, on the side of the blank axis opposite to the first cutting position, to the base cylinder of the desired involute helicoid and makes a predetermined angle with a plane perpendicular to the blank axis, in cutting flutes on the blank through said helicoidal surfaces to form teeth, in side relieving the sides of the teeth, and in radially relieving the tops of the teeth.

29. The method of forming a hob, which consists in rotating a blank, in rotating a formed milling cutter in engagement with the blank while effecting axial movement between the cutter and the blank to form a thread having appproximate involute helicoidal surfaces, in setting a cutting tool in engagement with the rotating blank, said tool having a cutting edge tangent to the base cylinder of the desired involute helicoid and making a predetermined angle with a plane perpendicular to the blank axis to cut an involute helicoidal surface on one side of the blank thread, in forming a similar involute helicoid on the opposite side of the blank thread, in cutting flutes on the blank, and in side relieving the sides of the teeth formed by said flutes.

30. The method of forming a hob, which consists in rotating a formed milling cutter in engagement with a blank while effecting axial movement between the cutting tool and the blank to form a thread having approximate involute helicoidal surfaces, in setting a cutting tool in engagement with the blank, said tool having a cutting edge tangent to the base cylinder of the desired involute helicoid and making a predetermined angle with a plane perpendicular to the blank axis to cut an involute helicoidal surface on one side of the blank thread, in forming a similar involute helicoid on the opposite side of the blank thread, in side relieving the sides of the teeth formed by said flutes, and in grinding the front cutting faces and the side cutting edges of the teeth.

31. The method of forming a hob, which consists in rotating a blank, in rotating a formed milling cutter in engagement with the blank while effecting axial movement between the cutter and the blank to form a thread having approximate involute helicoidal surfaces, in setting a cutting tool in engagement with the rotating blank, said tool having a cutting edge tangent to the base cylinder of the desired involute helicoid and making a predetermined angle with a plane perpendicular to the blank axis to cut an involute surface on one side of the blank thread, in forming a similar involute helicoid on the opposite side of the blank thread, in cutting flutes on the blank, in side relieving the sides of the teeth formed by said flutes, and in radially relieving the tops of the teeth.

32. The method of forming a hob, which consists in rotating a blank, in rotating a formed milling cutter in engagement with the blank while effecting axial feeding movement between the cutter and the blank to form a thread having approximate involute helicoidal surfaces, in setting a cutting tool in engagement with the rotating blank to cut an involute helicoidal surface on one side of the blank thread, said tool having a cutting edge tangent on one side of the blank axis to the base cylinder of the desired involute helicoid and making a predetermined angle with a plane perpendicular to the blank axis, in cutting an involute surface on the other side of the blank thread by setting a straight cutting edge in engagement with the rotating blank, said cutting edge being tangent, on the side of the blank axis opposite to the first cutting position, to the cylinder of the desired involute helicoid and makes a predetermined angle with a plane perpendicular to the blank axis for cutting an involute helicoidal surface on the opposite side of the blank thread, in cutting flutes on the blank, and in relieving the teeth formed by said flutes.

33. The method of forming a hob, which consists in rotating a blank, in rotating a formed milling cutter in engagement with the blank while effecting axial feeding movement between the cutter and the blank to form a thread having approximate involute helicoidal surfaces, in setting a cutting tool in engagement with the rotating blank to cut an involute helicoidal surface on one side of the blank thread, said tool having a cutting edge tangent on one side of the blank axis to the base cylinder of the desired involute helicoid and making a predetermined angle with a plane perpendicular to the blank axis, in cutting an involute surface on the other side of the blank thread by setting a straight cutting edge in engagement with the rotating blank, said cutting edge being tangent, on the side of the blank axis opposite to the first cutting position, to the cylinder of the desired involute helicoid and makes a predetermined angle with a plane perpendicular to the blank axis for cutting an involute helicoidal surface on the opposite side of the blank thread, in cutting flutes on the blank, and in side relieving the teeth formed by said flutes so that the effective contour behind each cutting surface is the same at successive surfaces of intersection similar to the initial cutting face.

34. The method of forming a hob, which consists in rotating a blank, in forming a thread on the blank having involute helicoidal surfaces, in cutting flutes on the blank through the thread, and in effecting a constant relief on the involute helicoidal surfaces of the hob teeth while maintaining the lead unchanged, whereby the effective contour behind each cutting surface is the same at successive surfaces of intersection similar to the initial cutting face.

35. The method of forming a hob, which consists in rotating a blank, in forming a thread having involute helicoidal surfaces, in cutting flutes on the blank through the thread to form teeth, in effecting constant relief on the sides of the teeth while maintaining the lead unchanged, and in radially relieving the tops of the teeth so that the effective contour behind each cutting surface is the same at successive surfaces of intersection similar to the initial cutting face.

In testimony whereof, I hereto affix my signature.

EARLE BUCKINGHAM.